United States Patent [19]
von Winnicki

[11] Patent Number: 4,555,660
[45] Date of Patent: Nov. 26, 1985

[54] CURRENT SUPPLY DEVICE FOR SERIES-FED ELECTRONIC CIRCUITS

[75] Inventor: Kalixt von Winnicki, Munich, Fed. Rep. of Germany

[73] Assignee: Siemens Aktiengesellschaft, Berlin & Munich, Fed. Rep. of Germany

[21] Appl. No.: 603,746

[22] Filed: Apr. 25, 1984

[30] Foreign Application Priority Data

Apr. 28, 1983 [DE] Fed. Rep. of Germany ....... 3315393

[51] Int. Cl.$^4$ .............................................. G05F 1/613
[52] U.S. Cl. .................................... 323/224; 323/268
[58] Field of Search ............... 323/224, 225, 231, 268, 323/271, 284, 285, 908

[56] References Cited

U.S. PATENT DOCUMENTS 3,174,094  3/1965  Farnsworth et al. .

FOREIGN PATENT DOCUMENTS 1060928  7/1959  Fed. Rep. of Germany .
2939546  4/1981  Fed. Rep. of Germany .

OTHER PUBLICATIONS

"A Low Power Regenerative Repeater For The T1 Digital Carrier System", Cunningham et al., National Telecommunications Conference 1977.
"Hybrid Approach to Regulation Solves Power-Supply Problems", Denker et al., Electronics, Aug. 1973, vol. 46, #76.

Primary Examiner—Peter S. Wong
Assistant Examiner—Judson H. Jones
Attorney, Agent, or Firm—Hill, Van Santen, Steadman & Simpson

[57] ABSTRACT

A current supply device for series-fed electronic circuits has a Zener diode interconnected between the input and the output for the feed current together with a rectifying diode and a charging capacitor, a first controllable impedance being connected between the charging capacitor and the consumer, and a second controllable impedance being connected in parallel with the consumer. Both controllable impedances are driven by a regulator which monitors the voltage supplied to the consumer, and maintains this voltage at a constant level.

15 Claims, 4 Drawing Figures

CURRENT SUPPLY DEVICE FOR SERIES-FED ELECTRONIC CIRCUITS

BACKGROUND OF THE INVENTION

1. Field of the Invention

The present invention relates to current supply means for series-fed electronic circuits, and in particular to such circuits having a Zener diode connected between the terminals for the feed current together with a rectifying diode and a charging capacitor, the electronic circuit being connected to a consumer.

2. Description of the Prior Art

Intermediate regenerative amplifiers (sometimes called repeaters or regenerators) are included at predetermined intervals along lines for the transmision of digital signals to a consumer. The intermediate amplifiers are generally supplied with a voltage in a series-feed arrangement. A constant current of approximately 50 mA is fed-in from a transmitting station, generally through the center tap of a transformer, and forms a loop so as to return to the transmitting station via the return data connection. A constant voltage is obtained in conventional devices for the supply votage for the intermediate amplifiers by means of a Zener diode, a rectifying diode, and a charging capacitor.

A current supply arrangement of this type is described in N.T.C. 1977, pages 44:1-1 to 1-4. This publication also describes problems caused by interference voltages. In order to minimize the effects of such interference voltages, the capacitance of the charging capacitor is selected to be as high as possible. Should the supply current temporarily be absent, the rectifying diode is disconnected and the circuit arrangement is supplied by means of the charging capacitor.

Currents of less than 5 mA effective at approximately 16 Hz represent common disturbances to the feed current. In some situations, however, current fluctuations of as much as 50 mA may effectively occur. Disturbances of 10 A at 50 Hz also may occur temporarily; in the event of lightening strikes current peaks of up to 100 A have been measured for a duration of 1 ms.

Such disturbances manifest themselves, for example, in the intermediate amplifiers by amplitude modulation and phase modulation (jitter) of the transmitted data.

SUMMARY OF THE INVENTION

It is an object of the present invention to provide a current supply means for series-fed electronic circuits which provides a constant voltage even in the event of considerable disturbances in the feed current.

The above object is inventively achieved in a current supply wherein a first controllable impedance is connected between the charging capacitor and the consumer (that is, the data receiver) and a second controllable impedance is connected in parallel with the consumer, and a regulator is provided which controls the two controllable impedances and which maintains the voltage to the consumer at a constant level.

The current supply system disclosed and claimed herein retains the Zener diode, the rectifying diode, and the charging resistor and capacitor employed in conventional supply systems, however, in the present system during normal operation the Zener diode corresponding to the Zener diode in conventional system does not function. This Zener diode instead limits the extreme voltage values which occur only rarely. The actual fine control of the voltage supply is undertaken by the controllable impedances. A load current reduction and excessive feed currents are prevented by increasing the conductivity of the controllable second impedance which is connected in prallel with the consumer.

If the feed current is temporarily smaller than the charging current, and as a result the voltage supplied to the consumer becomes too small, the conductivity of the first controllable impedance is increased until the capacitor voltage is directly connected to the consumer.

The current requirement for the current supply system disclosed and claimed herein is very small. In a critical situation the load current corresponds to the feed current, and current consumption is governed only by the small self-consumption of regulator.

The regulating means, consisting of the two controllable impedances and the regulator, is preferably also operable as a backwards regulation system. Because in the case of backwards regulation the voltage values are checked directly at the consumer, a simple regulating surface of adequate accuracy is obtained if the regulator possesses a high current amplification.

It is preferable for the regulator to be operable in a combined backwards-forwards regulating system. By combining backwards and forwards regulation, as is generally known, regulation error can be substantially zero with careful dimensioning.

It is further preferable to provide a common regulator for both the first and second controllable impedances. In one embodiment of the invention, a first differential amplifier may be utilized as the regulator. Such a differential amplifier facilitates a simple theoretical value/actual value comparison. Generally an operational amplifier may be used which, because of its high amplification, maintains the regulation error extremely low.

The controllable impedances may be bipolar or field effect transistors. At higher currents it is preferable to employ parallel-connected transistors or Darlington circuits.

In one embodiment of the invention, the first input of the first differential amplifier is connected to a reference voltage source, and the second input of that differential amplifier is connected in parallel to the consumer through an ohmic voltage divider. The output of the differential amplifier is connected through a Zener diode to the input of a first transistor functioning as the first controllable impedance. The output of the first differential amplifier is further connected to the input of the second transistor, operating as the second controllable impedance, which is connected in parallel to the consumer. The second transistor is preferably complimentary to the first transistor.

Level matching to the output of the differential amplifier is achieved by means of the Zener diodes. The complimentary transistors functioning as the first and second controllable impedances operate such that one transistor is conducting while the other transistor is non-conducting. The regulation ranges of the two transistors may, however, overlap.

In a further embodiment of the invention a voltage balancing circuit, which functions to produce two equal voltages, may be provided with a second differential amplifier in the form of a regulator which is connected to the same voltage source. By suitable dimensioning, the reference voltage source may also be utilized for the voltage balancing circuit. Thus only one regulator need be employed to produce two voltages.

As stated above, the current supply means disclosed and claimed herein is suitable for use at intermediate amplifiers for digital signals. The unfavorable disturbances resulting from supply voltage line interferences are largely eliminated by the current supply disclosed and claimed herein.

DESCRIPTION OF THE PREFERRED EMBODIMENTS

Figure 1:
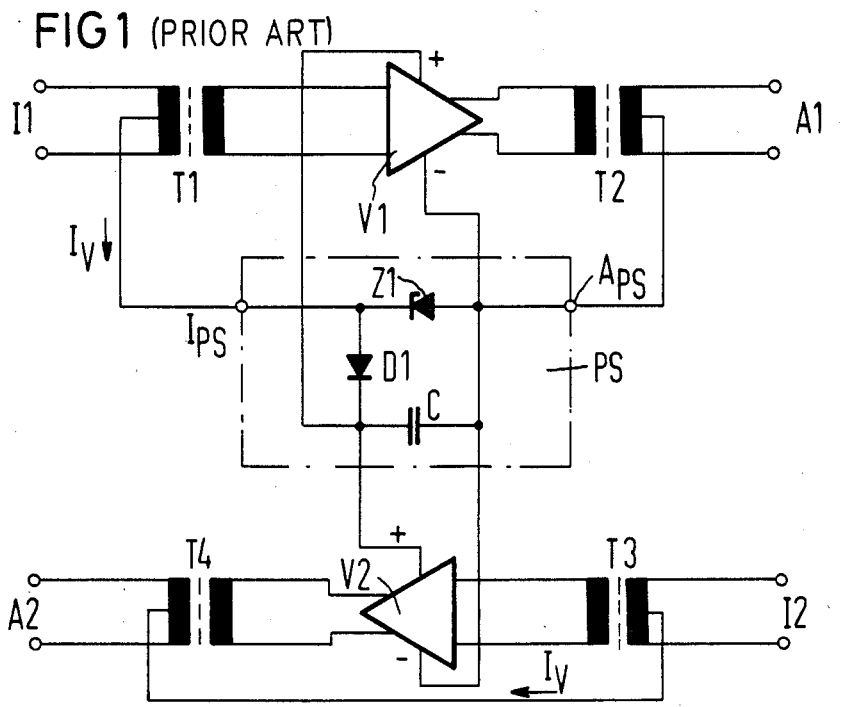
FIG. 1 is a circuit diagram illustrating the principle of series feed in intermediate amplifiers for digital signals in a conventional system.

A portion of a conventional digital signal transmission system is shown in FIG. 1 having a first intermediate amplifier for digital signals V1 connected in the outgoing or transmitting line of a transmission link, and having a second intermediate amplifier V2 connected in the return line of the same transmission link. The first intermediate amplifier V1 is electrically isolated from the outgoing line by means of a first transformer T1 at the input side and a second transformer T2 at the output side. The input of the outgoing line is referenced at I1, the output of the outgoing line being referenced at A1. The return line input is referenced I2 and the return line output is referenced A2. The second intermediate amplifier V2 is electrically isolated from the return line by transformers T3 and T4.

Generally a plurality of intermediate amplifiers are inserted in a transmission link, FIG. 1 showing only a section of such a transmission link. The intermediate amplifiers are supplied with current by means of series feed. A constant feed current $I_V$ is fed from an end station. The current flows across the two wires of the outgoing line and is tapped at a center tap of the first transformer T1 so as to be fed to the intermediate amplifiers V1 and V2 through a current supply unit PS. The input of the current supply unit PS is referenced $I_{PS}$, the output of that unit being referenced $A_{PS}$.

From a center tap of the second transformer T2, the current flows across the wires of the outgoing line to the next intermediate amplifier. At the end of the outgoing line, or at another location, the current is looped into the return line. the intermediate amplifiers are bypassed by virtue of the center taps of the transformers T3 and T4. Generally only one signal current supply unit TS is used for a pair of intermediate amplifiers, one in the outgoing line and one in the return line. The conventional current supply unit PS shown in FIG. 1 consists of a Zener diode Z1, a rectifying diode D1, and a charging capacitor C. The charging capacitor C functions as a filter and also supplies current when the feed current $I_V$ temporarily drops below a theoretical value as a result of disturbances. Residual disturbances, however, will always continue to occur across the charging capacitor C.

Figure 2:
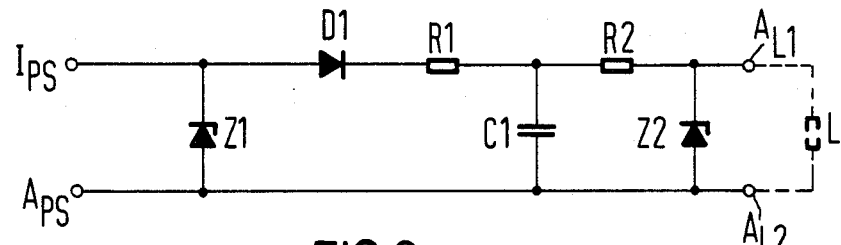
FIG. 2 is another embodiment of a conventional current supply for use in the system of FIG. 1.

A further embodiment of a conventional current supply unit for use in the system shown in FIG. 1 is illustrated in FIG. 2. This embodiment has a charging capacitor C1 which is charged by means of the input current, a rectifying diode D1 and a charging resistor R1. Voltage stabilization is achieved by a second Zener diode Z2, connected in parallel to a consumer L. The consumer terminals are referenced $A_{L1}$ and $A_{L2}$. The first Zener diode Z1 is again connected at the input of this circuit, between the input $I_{PS}$ and the output $A_{PS}$ of the current supply unit PS. This first Zener diode Z1 limits the input voltage of the current supply in the case of extreme disturbances. Although the second Zener diode Z2 provides better stabilization than is achieved in the first embodiment shown in FIG. 1, residual disturbances will again nonetheless remain across the charging capacitor C1. It is possible to connect a second resistor R2 between the charging capacitor C1 and the second Zener diode Z2. Although this improves the regulating capacity of the second Zener diode Z2, the second resistor R2 results in a further voltage drop which, particularly in the case of excessively small supply currents, results in a voltage fluctuation across the consumer L. In the case of an excessively low feed current, the consumer is supplied solely from the charging capacitor C1, which must consequently assume relatively high values. In the event of too low a feed current, the rectifier diode D1 disconnects the charging capacitor from the input $I_{PS}$.

Figure 3:
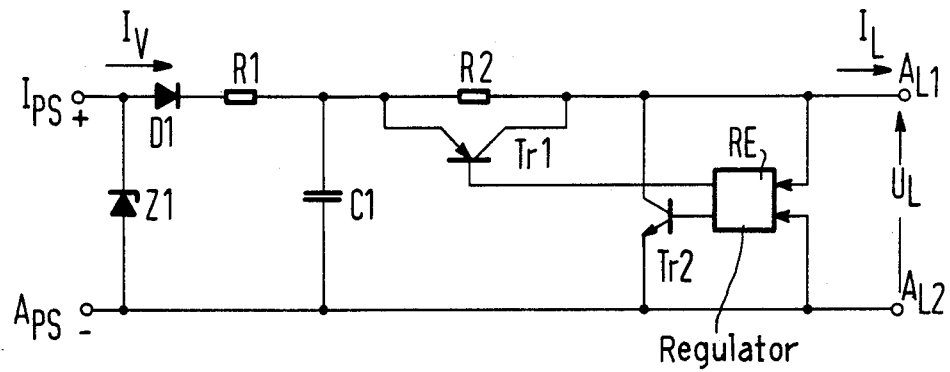
FIG. 3 is a circuit diagram for a current supply constructed in accordance with the principles of the present invention.

A circuit constructed in accordance with the principles of the present invention is shown in FIG. 3. Elements in FIG. 3 (and as discussed below in FIG. 4) performing similar functions as elements in FIG. 1 and FIG. 2 are identified with the same reference symbols. The circuit shown in FIG. 3 has a first Zener diode Z1 connected between the input $I_{PS}$ and the output $A_{PS}$ of the current supply device. The charging capacitor C1 is connected to the input $I_{PS}$ through a rectifying diode D1 and a charging resistor R1, and is directly connected to the output $A_{PS}$ of the current supply unit. This much of the circuit shown in FIG. 3 is the same as that shown in FIG. 2. In the circuit shown in FIG. 3, however, a first transistor Tr1 is connected as a controllable impedance between the charging capacitor C1 and the consumer (only the outputs $A_{L1}$ and $A_{L2}$ for the consumer being shown in FIG. 3). The first transistor Tr1 is connected in parallel across its emitter and collector to a second resistor R2. A second transistor Tr2 is connected across its collector-emitter terminals in parallel to the consumer and thus is disposed across the output terminals $A_{L1}$ and $A_{L2}$. Both the transistors Tr1 and Tr2 are controlled by a regulator RE, whose inputs are also connected to the output terminals $A_{L1}$ and $A_{L2}$.

The first Zener diode Z1 functions for limiting the input voltage. By means of the two transistors Tr1 and Tr2 the supply voltage $U_L$ to the consumer is regulated. The voltage across the charging capacitor C1 is available to the regulating device as an input voltage. It will be understood as used herein that the term "regulating device" in the embodiment of FIG. 3 includes the regulator RE and the transistors connected thereto. Operation of the regulating device shown in FIG. 3 is as follows. It will first be assumed that both the feed current $I_V$ and the load current $I_L$ are at their theoretical values. Both the transistors Tr1 and Tr2 are thus initially blocked. If a reduction occurs in the load current $I_L$ or an increase occurs in the supply current $I_V$ as a result of disturbances, the second transistor Tr2 is rendered conductive by the regulator RE. As a result of the voltage drop across the second resistor R2, the voltage $U_L$ across the consumer remains constant. If an increase occurs in the load current $I_L$ commencing from the theoretical value, or a reduction occurs in the voltage across the charging capacitor C1 as a result of disturbances, the first transistor Tr1 becomes conductive and thus causes a smaller voltage drop across the second resistor R2. In extreme circumstances in practice the voltage of the charging capacitor C1 is connected to the consumer.

The first controllable impedance may not exceed a maximum value so that in normal circumstances the first Zener diode Z1 is in a blocking state. This maximum value is determined by the resistor R2. The voltage drop across the resistor R2 and the charging capacitor C1 governs the length of time during which the load current can still be supplied without a feed current flowing. In a preferred embodiment of the current supply device shown in FIG. 3, the regulating or operating ranges of the first transistor Tr1 and the second transistor Tr2 overlap.

Figure 4:
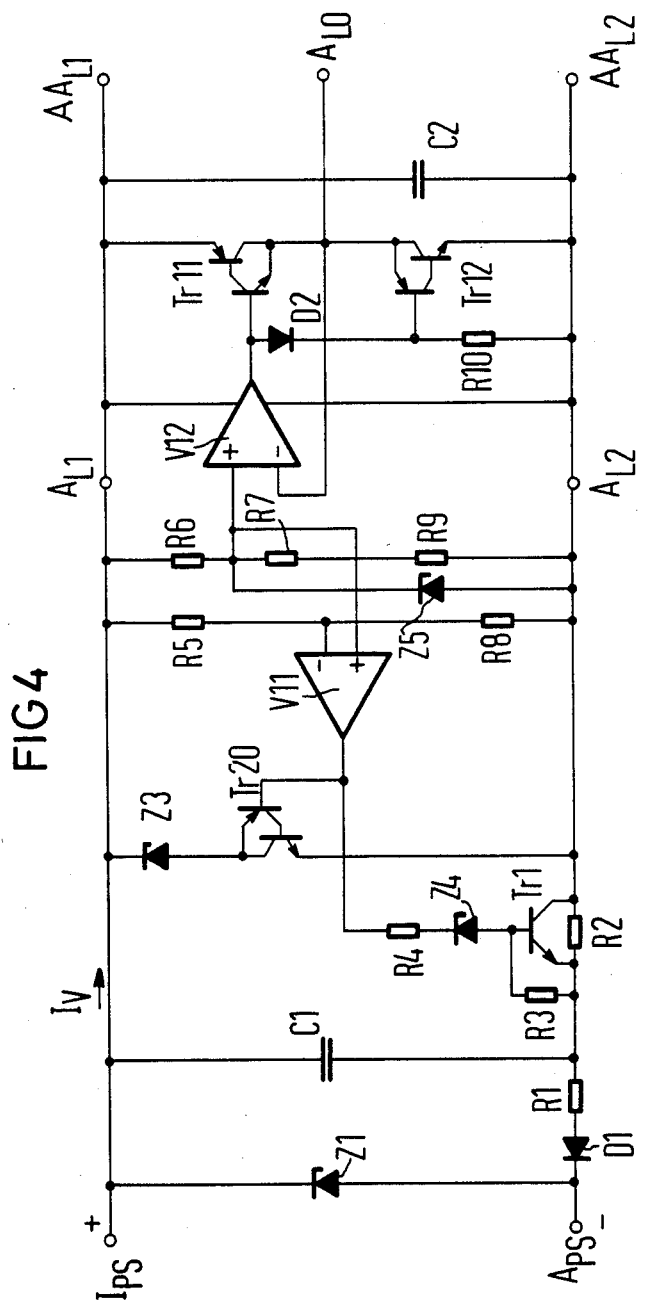
FIG. 4 is a further embodiment of a current supply constructed in accordance with the principles of the present invention.

A further embodiment of the current supply device disclosed and claimed herein is shown in FIG. 4. The Zener diode Z1 is again connected between the terminals $I_{PS}$ and $A_{PS}$. In this embodiment the rectifying diode D1 and the charging resistor R1 are connected in the return line for the feed current $I_V$. The charging capacitor C1 is connected between the charging resistor R1 and the input of the current supply device $I_{PS}$.

The first transistor Tr1 is an NPN transistor connected in the return line of the supply current $I_V$. The second resistor R2 is connected in parallel therewith. A third resistor R3 is connected across the base and emitter of the first transistor Tr1. The base of the first transistor Tr1 is connected to the output of a first differential amplifier V11 through a fourth Zener diode Z4 and a fourth resistor R4. The differential amplifier V11 may be a commercially available operational amplifier. In the embodiment of FIG. 4, the second transistor of the previous embodiment is replaced by a Darlington drive arrangement Tr20 having an active emitter connected through a third Zener diode Z3 to the input $I_{PS}$ of the current supply device, and having an active collector connected to the second output terminal $A_{L2}$. The Darlington arrangement Tr20 is thus arranged in parallel with the output terminals $A_{L1}$ and $A_{L2}$. In the embodiment shown in FIG. 4, a PNP-NPN Darlington stage has been used. The input of this Darlington stage is connected to the output of the first differential amplifier V11. A series arrangement of three resistors R6, R7 and R9 is connected across the output terminals $A_{L1}$ and $A_{L2}$, and the node between the resistors R9 and R7 is connected to a fifth Zener diode Z5 which supplies the reference voltage for the first (non-inverting) input (+) of the differential amplifier V11. The resistor R7 effects compensation. The second (inverting) input (−) of the first differential amplifier V11 is connected to the center node of another voltage divider consisting of resistors R5 and R8, also connected across the output terminals $A_{L1}$ and $A_{L2}$. This portion of the circuit corresponds to the fundamental circuit shown in FIG. 3.

Because generally a positive and a negative supply voltage are required, a voltage balancing circuit is connected to the output terminals $A_{L1}$ and $A_{L2}$ in the embodiment shown in FIG. 4. This balancing circuit has two series-complimentary transistor stages Tr11 and Tr12 which are driven by a second differential amplifier V12. The transistor stages may be complimentary Darlington stages. The first input (+) of the second differential amplifier V12 is connected to the same reference voltage source as the first differential amplifier V11. The second input (−) of the second differential amplifier V12 is connected to the node between the outputs of the two transistor stages Tr11 and Tr12. This node is connected to a third output terminal $A_{LO}$. The input of the first complimentary transistor stage Tr11 of the voltage balancing circuit is directly connected to the output of the second differential amplifier V12. The input of the second complimentary transistor stage Tr12 is also connected to the output of the amplifier V12, through a rectifying diode D2. The input of the second complimentary transistor stage Tr12 is connected to the terminal $A_{L2}$ through a resistor R10.

The output terminals $AA_{L1}$ and $AA_{L2}$ of the voltage balancing circuit are the same as the output terminals $A_{L1}$ and $A_{L2}$ of the current supply device. The complimentary transistor stages Tr11 and Tr12 are connected in series between these outputs with their emitters connected to the output terminal $A_{LO}$. The output terminal $AA_{L1}$ has a positive potential, whereas the output terminal $AA_{L2}$ has a negative potential, in each case relative to the terminal $A_{LO}$. A second capacitor C2 is connected between the output terminals $AA_{L1}$ and $AA_{L2}$ for further filtering.

The embodiment of the current supply device shown in FIG. 4 functions the same as the fundamental circuit diagram shown in FIG. 3. The third Zener diode Z3 and the fourth Zener diode Z4 each effect a potential shift which permits the use of a single regulator, such as the differential amplifier V11. By means of the Zener diode Z5 connected in parallel across a portion of the series arrangement of resistors R6, R7 and R9, a reference voltage is obtained which is compared with the voltage $U_L$ across the output terminals $A_{L1}$ and $A_{L2}$. The comparison is effected through the voltage divider consisting of resistors R5 and R8 which is connected to the second input (−) of the first differential amplifier V11. The transistor Tr1 is complimentary to the Darlington stage Tr20. If, for example, the Darlington stage Tr20 is operated closer to saturation, the first transistor Tr1 is as a result further or completely blocked, and vice versa.

Because the reference voltage corresponds to exactly half of the theoretical consumer voltage, this reference voltage can also be utilized as a reference voltage for the voltage balancing circuit.

Although modifications and changes may be suggested by those skilled in the art it is the intention of the inventor to embody within the patent warranted hereon all changes and modifications as reasonably and properly come within the scope of his contribution to the art.

I claim as my invention:

1. A current supply device for a series-fed electronic consumer circuit, said supply device comprising:

input and output terminals for the feed current;

a Zener diode and a charging capacitor connected in parallel across said terminals;

a rectifying diode and a charging resistor connected in series to said input terminal between said charging capacitor and said Zener diode; and a regulating device having a first controllable impedance connected between said consumer circuit and said charging capacitor, a second controllable impedance connected in parallel with said consumer circuit, and a regulating means for controlling said first and second controllable impedances for maintaining the voltage across said consumer circuit constant.

2. A current supply device as claimed in claim 1 wherein said regulating device is operable as a backwards regulating device.

3. A current supply device as claimed in claim 1 wherein said regulating device is operable as a combined backwards-forwards regulating device.

4. A current supply device as claimed in claim 1 wherein said regulating means is a single common regulator connected to each of said first and second controllable impedances.

5. A current supply device as claimed in claim 4 wherein said controllable impedances are transistors and the non-inverting input of said differential amplifier is connected to a reference voltage source, said current supply device further comprising:
   an ohmic voltage divider connected across said consumer circuit, the inverting input of said differential amplifier being connected to a node of said voltage divider;
   an additional Zener diode connected between the output of said differential amplifier and the control electrode of said first controllable impedance;
   said output of said differential amplifier being also connected to the control electrode of said second controllable impedance; and
   said second controllable impedance being complimentary to said first controllable impedance.

6. A current supply device as claimed in claim 5 wherein said second controllable impedance is a Darlington transistor arrangement.

7. A current supply device as claimed in claim 5 wherein said reference voltage source comprises a plurality of series-connected resistors connected across said consumer circuit and a Zener diode connected in parallel across a portion of said plurality of resistors.

8. A current supply device as claimed in claim 5 further comprising a voltage balancing circuit for producing two equal voltages connected in parallel across said consumer circuit and having a balancing circuit regulator means connected to said reference voltage source.

9. A current supply device as claimed in claim 8 wherein said balancing circuit regulating means is a further differential amplifier having a non-inverting input connected to said reference voltage source.

10. A current supply device as claimed in claim 8 wherein the output of said balancing circuit regulating means is connected to a first balancing circuit controllable impedance and is connected through an additional rectifying diode to a second balancing circuit controllable impedance, the outputs of said balancing circuit controllable impedances being connected at a node functioning as a reference terminal for said two equal voltages.

11. A current supply device as claimed in claim 10 wherein said first and second balancing circuit controllable impedances are each Darlington transistor arrangements.

12. A current supply device as claimed in claim 1 wherein said controllable impedances are transistors.

13. A current supply device as claimed in claim 11 wherein said trasistors are are bipolar transistors.

14. A current supply device as claimed in claim 12 wherein said transistors are field effect transistors.

15. A current supply device as claimed in claim 1 wherein said device is connected in a transmission link for supplying current to intermediate amplifiers for digital signals.

* * * * *